US012765559B2

(12) United States Patent
Arimoto

(10) Patent No.: US 12,765,559 B2
(45) Date of Patent: Oct. 20, 2026

(54) SPIDER MITE REPELLENT

(71) Applicant: Riken, Wako (JP)

(72) Inventor: Yutaka Arimoto, Wako (JP)

(73) Assignee: RIKEN, Wako (JP)

( * ) Notice: Subject to any disclaimer, the term of this patent is extended or adjusted under 35 U.S.C. 154(b) by 373 days.

(21) Appl. No.: 18/262,406

(22) PCT Filed: Jan. 24, 2022

(86) PCT No.: PCT/JP2022/002405
§ 371 (c)(1),
(2) Date: Jul. 21, 2023

(87) PCT Pub. No.: WO2022/158590
PCT Pub. Date: Jul. 28, 2022

(65) Prior Publication Data

US 2024/0215588 A1 Jul. 4, 2024

(30) Foreign Application Priority Data

Jan. 25, 2021 (JP) ................................ 2021-009480

(51) Int. Cl.
*A01N 65/08* (2009.01)
*A01N 25/30* (2006.01)
*A01P 17/00* (2006.01)

(52) U.S. Cl.
CPC ............ *A01N 65/08* (2013.01); *A01N 25/30* (2013.01); *A01P 17/00* (2021.08)

(58) Field of Classification Search
None
See application file for complete search history.

(56) References Cited

U.S. PATENT DOCUMENTS

| | | | |
|---|---|---|---|
| 2006/0165748 A1 | 7/2006 | Arimoto | |
| 2007/0190096 A1 | 8/2007 | Arimoto | |
| 2009/0286877 A1 | 11/2009 | Arimoto et al. | |
| 2015/0230459 A1 | 8/2015 | Arimoto et al. | |

FOREIGN PATENT DOCUMENTS

| | | | |
|---|---|---|---|
| CN | 106074332 | * | 11/2016 |
| CN | 106137907 | * | 11/2016 |
| JP | S568308 A | | 1/1981 |
| JP | 2014024756 A | | 2/2014 |
| JP | 2017-124993 | * | 7/2017 |
| JP | 2021153561 A | | 10/2021 |
| WO | 2005004602 A1 | | 1/2005 |
| WO | 2006028170 A1 | | 3/2006 |
| WO | 2007117001 A1 | | 10/2007 |

OTHER PUBLICATIONS

EWG's Skin Deep, 11 Pages, 2025. (Year: 2025).*
Extended European Search Report dated Oct. 31, 2024, issued by the European Patent Office in corresponding European Application No. 22742709.3-1102, (10 pages).
Alvarez, S. M. et al. "Synthesis of Fatty Acid Methyl Esters from Pomace Oil Catalyzed by Zinc Stearate: A Kinetic Study of the Transesterification and Esterification Reactions", Catalysts, vol. 9, No. 12, Nov. 21, 2019 (Nov. 21, 2019), p. 978 (total 15 pages), XP09321681 0, DOI: 10.3390/catal9120978.
Tsolakis, H. et al. "Effects of a mixture of vegetable and essential oils and fatty acid potassium salts on Tetranychus urticae and Phytoseiulus persimilis", Ecotoxicology and Environmental Safety, Academic Press, San Diego, CA, US, vol. 70, No. 2, Jun. 1, 2008 (Jun. 1, 2008), pp. 276-282, XP022615538, ISSN: 0147-6513, DOI: 10.1016/J.ECOENV.2007.10.001 [retrieved on Nov. 26, 2007].
Roy, S. et al., "Evaluation of certain nonconventional plant based oils against red spider mite of tea", Journal of Environmental Biology, vol. 39, No. 1, Jan. 1, 2018 (Jan. 1, 2018), pp. 1-4, XP093216388, in ISSN: 0254-8704, DOI: 10.22438/jeb/39/1/MRN-491.
Marcic, O. et al. "Field and greenhouse evaluation of rapeseed spray oil against spider mites, green peach aphid and pear psylla in Serbia", Bulletin of Insectology, vol. 62, No. 2, Jan. 2, 2009 (Jan. 2, 2009), pp. 159-167, XP093216400, IT ISSN: 1721-8861 Retrieved from the Internet: URL: http://www.bulietinofinsectology.org/pdfarticles/vol62-2009-159-167marcic.pdf.
International Search Report (PCT/ISA/210) with an English translation, and Written Opinion (PCT/ISA/237) mailed on Mar. 22, 2022, by the Japanese Patent Office as the International Searching Authority for International Application No. PCT/JP2022/002405. (10 pages).

* cited by examiner

*Primary Examiner* — Michael V Meller
(74) *Attorney, Agent, or Firm* — BUCHANAN INGERSOLL & ROONEY PC

(57) ABSTRACT

A spider mite repellent comprises at least one oil selected from the group consisting of olive oils, olive pomace oils, and partially hydrogenated high-oleic rapeseed oils as an active ingredient.

10 Claims, No Drawings

SPIDER MITE REPELLENT

TECHNICAL FIELD

The present invention relates to a spider mite repellent.

BACKGROUND ART

Spider mites each having eight legs are classified as members of the Arachnida class. The spider mites are parasitic mainly on leaves of plants and are phytophagous to suck sap from mesophyll tissue. Sucking marks are generated in leaves after sucking, and a plant dies if the damage is large. Having a high ability to walk, the spider mites migrate from plant to plant and suck sap from mesophyll tissue. For this reason, the spider mites cause enormous damage on agricultural plants, fruit vegetables, fruit trees, and the like. As schemes for controlling such spider mites, chemical control, biological control, physical control, and so forth have been proposed, and organic phosphorus agents, carbamate agents, synthetic pyrethroid agents, and so forth have been used as chemicals. However, when the chemicals are used, many insect pests acquire resistance to these chemicals and their effects are gradually reduced or completely lost in many cases. In addition, since many of the chemicals are toxic to humans and animals, there is also a problem that heavy use of the chemicals is difficult. Some biological control and physical control schemes are effective, but the current situation is that there is not any scheme that is fully satisfactory from the viewpoints of cost, general-purpose properties, and so on. Therefore, there is a need for an insect pest control scheme with low cost, high general-purpose properties, and safety to humans and animals.

As a repellent with low toxicity to humans and animals, Patent Literature 1 proposes that an agent containing, as an active ingredient, a glycerin fatty acid ester, a sorbitan fatty acid ester, a sucrose fatty acid ester, or the like is used against winged pests such as whiteflies.

CITATION LIST

Patent Literatures

Patent Literature 1: International Publication No. WO2006/028170

SUMMARY OF INVENTION

Problems to be Solved by the Invention

Unlike the winged pests such as whiteflies, however, spider mites have no ability to fly. After being accidentally attached to a target plant by wind or by being brought in by a farmer, the spider mites migrate from leaf to leaf by walking and spread their feeding damage. In the case of winged pests, feeding damage can be reduced by inhibiting the winged pests from flying to target plants. On the other hand, repellents to inhibit the flying to target plants as described in Patent Literature 1 cannot be expected to be effective against the spider mites. Therefore, there is a demand for a novel repellent effective against the spider mites.

The present invention was made in view of the above points, and has an object to provide a repellent that gives little influence on an environment and is effective against the spider mites.

Means for Solution of the Problems

As a result of earnest studies to achieve the above object, the present inventor has found that use of an olive oil, an olive pomace oil and/or a partially hydrogenated high-oleic rapeseed oil as an active ingredient makes it possible to obtain a repellent that gives little influence on an environment and is effective against spider mites, and thereby completed the present invention.

Specifically, the present invention is summarized as follows.

[1] A spider mite repellent comprising at least one oil selected from the group consisting of olive oils, olive pomace oils, and partially hydrogenated high-oleic rapeseed oils as an active ingredient.

[2] The spider mite repellent according to [1], further comprising alcohol having 1 to 4 carbon atoms.

[3] The spider mite repellent according to [2], wherein the alcohol is ethanol and/or 1-propyl alcohol.

[4] The spider mite repellent according to [2] or [3], wherein the alcohol is ethanol.

[5] The spider mite repellent according to any one of [1] to [4], further comprising a surfactant.

[6] A method for repelling spider mites from a plant, comprising applying the spider mite repellent according to any one of [1] to [5] to the plant.

[7] A method for preventing or reducing feeding damage by spider mites on a plant, comprising applying the spider mite repellent according to any one of [1] to [5] to the plant.

Advantageous Effect of Invention

According to the present invention, it is possible to provide a novel spider mite repellent capable of inhibiting feeding damage by spider mites.

DESCRIPTION OF EMBODIMENTS

<<Spider Mite Repellent>>

A first embodiment of the present invention is a spider mite repellent comprising, as an active ingredient, at least one oil selected from the group consisting of olive oils, olive pomace oils, and partially hydrogenated high-oleic rapeseed oils.

<Oil>

The spider mite repellent of the present invention comprises, as an active ingredient, at least one oil (hereinafter referred to as an active ingredient oil in some cases) selected from the group consisting of olive oils, olive pomace oils, and partially hydrogenated high-oleic rapeseed oils. Preferably, the spider mite repellent of the present invention comprises only one selected from the group consisting of olive oils, olive pomace oils, and partially hydrogenated high-oleic rapeseed oils as an active ingredient.

The partially hydrogenated high-oleic rapeseed oil is an oil in which some of the double bonds of unsaturated fatty acids among the fatty acids constituting a high-oleic rapeseed oil are converted into single bonds by a hydrogenation treatment. As the partially hydrogenated high-oleic rapeseed oil, an oil in which the ratio of oleic acid (C18:1) is 80% by mass or more in the constituent fatty acids is preferable, an oil in which the ratio of oleic acid is 80 to 90% by mass in the constituent fatty acids is more preferable, an oil in which the ratio of oleic acid is 80 to 90% by mass and the ratio of linoleic acid (C18:2) is 10% by mass or less in the constituent fatty acids is more preferable, an oil in which the ratio of oleic acid is 80 to 90% by mass and the ratio of linoleic acid is 3 to 10% by mass in the constituent fatty acids is even more preferable, an oil in which the ratio of oleic acid is 80 to 90% by mass, the ratio of linoleic acid is 3 to 10% by mass, and the ratio of linolenic acid is 1% by mass or less in the constituent fatty acids is even more preferable, an oil in which the ratio of oleic acid is 80 to 90% by mass, the ratio of linoleic acid is 3 to 10% by mass, the ratio of linolenic acid is 0.5% by mass or less, and the ratio of stearic acid is 1 to 3% by mass in the constituent fatty acids is even more preferable, and an oil in which the ratio of oleic acid is 80 to 90% by mass, the ratio of linoleic acid is 3 to 10% by mass, the ratio of linolenic acid is 0.5% by mass or less, the ratio of stearic acid is 1 to 3% by mass, and the ratio of palmitic acid is 2 to 6% by mass in the constituent fatty acids is even more preferable. In the partially hydrogenated high-oleic rapeseed oil, the ratio of linolenic acid in the constituent fatty acids is particularly preferably 0% by mass. An example of a preferable oil satisfying the above numeric value ranges is LO-1 (Actor LO-1 manufactured by Riken Vitamin Co., Ltd.).

The olive pomace oil is an olive pomace oil defined by the International olive council (IOC). As the olive pomace oil, an olive pomace oil in which the ratio of oleic acid is 70% by mass or more in the constituent fatty acids is preferable, an olive pomace oil in which the ratio of oleic acid is 70 to 80% by mass in the constituent fatty acids is more preferable, an olive pomace oil in which the ratio of oleic acid is 70 to 80% by mass and the ratio of linoleic acid is 5 to 15% by mass in the constituent fatty acids is even more preferable, an olive pomace oil in which the ratio of oleic acid is 70 to 80% by mass, the ratio of linoleic acid is 8 to 12% by mass, and the ratio of linolenic acid is 0.1 to 5% by mass in the constituent fatty acids is even more preferable, and an olive pomace oil in which the ratio of oleic acid is 70 to 80% by mass, the ratio of linoleic acid is 8 to 12% by mass, the ratio of linolenic acid is 0.1 to 5% by mass, and the ratio of palmitic acid is 5 to 15% by mass in the constituent fatty acids is even more preferable.

As the olive oil (preferably an extra virgin olive oil), an olive oil in which the ratio of oleic acid is 75% by mass or more in the constituent fatty acids is preferable, an olive oil in which the ratio of oleic acid is 75 to 85% by mass in the constituent fatty acids is more preferable, an olive oil in which the ratio of oleic acid is 75 to 85% by mass and the ratio of linoleic acid is 3 to 8% by mass in the constituent fatty acids is even more preferable, an olive oil in which the ratio of oleic acid is 75 to 85% by mass and the ratio of linoleic acid is 3 to 8% by mass, and the ratio of linolenic acid is 0.1 to 5% by mass in the constituent fatty acids is even more preferable, and an olive oil in which the ratio of oleic acid is 75 to 85% by mass, the ratio of linoleic acid is 3 to 8% by mass, the ratio of linolenic acid is 0.1 to 5% by mass, and the ratio of palmitic acid is 5 to 15% by mass in the constituent fatty acids is even more preferable.

In all of the partially hydrogenated high-oleic rapeseed oils, the olive pomace oils, and the olive oils, the ratio of oleic acid in the constituent fatty acids is high. However, the present inventor has confirmed that a sufficient repellent effect against spider mites is not obtained by an oleic acid-rich sunflower oil (about 84% by mass of oleic acid and about 7 to 8% by mass of linoleic acid) and an oleic acid-rich safflower oil (about 79% by mass of oleic acid and about 12% by mass of linoleic acid) each having a high ratio of oleic acid in the constituent fatty acids (see Test 2 in Examples described herein). In addition, the present inventor has also confirmed that the sufficient repellent effect against spider mites is not obtained even by using a normal oleic acid-rich rapeseed oil (oleic acid-rich canola oil) which is not partially hydrogenated (about 76% by mass of oleic acid, about 14% by mass of linoleic acid, and about 2% by mass of linolenic acid) (see Test 2 in Examples described herein). Therefore, the reason why the repellent effect against spider mites in the present invention is obtained is not fully explained based on the ratio of oleic acid in the oil. In the present invention, the effect is exerted by selecting a particular oil, that is, by selecting at least one oil selected from the group consisting of olive oils, olive pomace oils, and partially hydrogenated high-oleic rapeseed oils.

The spider mite repellent of the present invention may contain another ingredient in addition to the above particular oil. Examples of the other ingredient include an oil or fat (plant oil or fat) other than the above and an auxiliary agent. In the case where an oil or fat other than the above is contained, the ratio of the oil or fat other than the above in the total oil and fat is less than 50% by mass, preferably 30% by mass or less, more preferably 20% by mass or less, even more preferably 10% by mass or less, even more preferably 5% by mass or less, and even more preferably 3% by mass or less.

In the present specification, the auxiliary agent refers to an ingredient that assists dissolution/dispersion of the aforementioned oil as the active ingredient in a diluent (specifically, water) or helps the aforementioned oil to adhere to the surfaces of plants. Examples of the auxiliary agent include alcohol, a surfactant, and the like.

<Alcohol>

The spider mite repellent of the present invention may contain alcohol. As the alcohol, alcohol having 1 to 4 carbon atoms is preferable, ethanol and/or 1-propyl alcohol is/are more preferable, and ethanol is even more preferable.

Containing the alcohol, the spider mite repellent is well dispersed and emulsified in water. When the active ingredient oil is evenly emulsified, the repellent effect is enhanced and also stabilized.

The content of the alcohol per 100 parts by mass of the active ingredient oil is preferably 0.1 to 10 parts by mass, more preferably 0.5 to 5 parts by mass, and even more preferably 1 to 3 parts by mass.

<Surfactant>

The spider mite repellent of the present invention may contain a surfactant. The spider mite repellent of the present invention can obtain the repellent effect against spider mites even without addition of a surfactant. However, an addition of a surfactant makes it possible to evenly disperse and emulsify the active ingredient oil in water and thereby evenly attach the active ingredient oil to plants. Therefore, the active ingredient oil can adhere to plants evenly over a long term to exhibit the effect. Examples of the surfactant include a nonionic surfactant, a cationic surfactant, an anionic surfactant, and the like. Since the purpose of adding the surfactant in the present invention is as described above, any conventionally-used surfactant can be used without particular limitation on the type of a surfactant.

Examples of the nonionic surfactant include sorbitan fatty acid ($C_{8-18}$) esters (specifically such as sorbitan monostearate, sorbitan monopalmitate, sorbitan monooleate, and sorbitol monolaurate), glycerin fatty acid ($C_{8-18}$) esters (specifically such as glycerol monostearate and glycerol monooleate), propylene glycol fatty acid ($C_{8-18}$) esters (specifically such as propylene glycol monostearate, propylene glycol monooleate, and propylene glycol monopalmitate), sucrose fatty acid ($C_{8-18}$) esters (specifically such as sucrose stearate ester, sucrose palmitate ester, sucrose myristate ester, sucrose oleate ester, sucrose laurate ester, and sucrose behenate ester), polyglycerin fatty acid ($C_{8-18}$) esters (specifically such as diglycerin monooleate, diglycerin monostearate, decaglycerin monolaurate, decaglycerin monooleate, and fatty acid polyglyceride), organic acid monoglycerides (specifically such as acetic acid monoglyceride, lactic acid monoglyceride, citric acid monoglyceride, diacetyl tartaric acid monoglyceride, and succinic acid monoglyceride), fatty alcohol polyglycol ether, acetylene glycol, acetylene alcohol, oxyalkylene block polymer, polyoxyethylene ($C_{8-18}$) alkyl ether (specifically such as polyoxyethylene lauryl ether), polyoxyethylene alkyl aryl ether, polyoxyethylene styryl aryl ether, polyoxyethylene glycol alkyl ether, polyoxyethylene fatty acid esters (specifically such as polyoxyethylene glycol monolaurate, polyoxyethylene glycol monostearate, and polyoxyethylene glycol monooleate), polyoxyethylene sorbitan fatty acid ($C_{8-18}$) esters (specifically such as polyoxyethylene sorbitan monolaurate, polyoxyethylene sorbitan monopalmitate, polyoxyethylene monostearate, and polyoxyethylene sorbitan monooleate), polyoxyethylene sorbitol fatty acid esters (specifically such as polyoxyethylene sorbitol tetraoleate), polyoxyethylene glycerin fatty acid esters (specifically such as polyoxyethylene glyceryl monostearate, and polyoxyethylene glyceryl oleate), polyoxyethylene hydrogenated castor oil, polyoxyethylene castor oil, polyoxypropylene fatty acid esters or the like, and polyoxyethylene alkylamine (specifically such as polyoxyethylene cocoamine).

Among these, polyoxyethylene hydrogenated castor oil, polyoxyethylene castor oil, and polyglycerin fatty acid ($C_{8-18}$) esters are preferable, and polyoxyethylene hydrogenated castor oil, polyoxyethylene castor oil, and diglycerin monooleate (for example, POEM DO-100V (product name, manufactured by Riken Vitamin Co., Ltd.)) are more preferable.

Examples of the cationic surfactant include alkoxylated fatty amine, alkylamine salt (specifically such as coconutamine acetate and stearylamine acetate), quaternary ammonium salt (specifically such as lauryltrimethylammonium chloride and stearyltrimethylammonium chloride), and so on. Genamin C100 (product name, manufactured by CLARIANT) or the like is preferable.

Examples of the anionic surfactant include fatty acid salt, benzoate, alkylsulfosuccinate, dialkylsulfosuccinate, alkyl sulfate ester salt, alkyl sulfate, alkyl diglycol ether sulfate, alcohol sulfate ester salt, alkylsulfonate, ligninsulfonate, alkyldiphenyl ether disulfonate, polystyrene sulfonate, alkyl phosphate ester salt, alkyl aryl phosphate, styrylaryl phosphate, polyoxyethylene alkyl ether sulfate ester salt, polyoxyethylene alkylaryl ether sulfate, polyoxyethylene styrylaryl ether sulfate, polyoxyethylene styrylaryl ether ammonium sulfate (ammonium polyoxyethylene styrylaryl ether sulfate), polyoxyethylene alkylaryl ether sulfate ester salt, polyoxyethylene alkyl ether phosphate, polyoxyethylene alkylaryl phosphate ester salt, and polyoxyethylene styrylaryl ether phosphate ester or salt thereof, and so on.

Among these, the surfactant preferably contains a nonionic surfactant and more preferably contains only a nonionic surfactant. It is even more preferable to use a combination of diglycerin monooleate and at least one selected from polyoxyethylene hydrogenated castor oil and polyoxyethylene castor oil. It is even more preferable to use a combination of diglycerin monooleate and polyoxyethylene hydrogenated castor oil or use a combination of diglycerin monooleate and polyoxyethylene castor oil.

As the surfactant, one surfactant may be used alone or two or more surfactants may be used in combination. The content of the surfactant per 100 parts by mass of the active ingredient oil is preferably 0.1 to 30 parts by mass, more preferably 0.5 to 20 parts by mass, more preferably 0.5 to 10 parts by mass, even more preferably 1 to 5 parts by mass, and even more preferably 1 to 3 parts by mass.

The spider mite repellent of the present invention may contain water. When the spider mite repellent contains water, the repellent does not have to be diluted before use or the amount of water to be used for the dilution when the repellent is used can be reduced. In the case where water is contained, the spider mite repellent preferably contains water so that the concentration of the active ingredient oil in the spider mite repellent is diluted by 2 to 1,000-fold, preferably 10 to 800-fold, more preferably 20 to 500-fold, even more preferably 30 to 400-fold, even more preferably 40 to 300-fold, even more preferably 50 to 200-fold, and most preferably 100-fold.

Also, in the case where water is contained, the spider mite repellent preferably contains water so that the concentration of the active ingredient oil in the spider mite repellent is 10 to 10,000 mg/100 mL. In the case where water is contained, the concentration of the active ingredient oil in the spider mite repellent is preferably 20 to 8,000 mg/100 mL, more preferably 50 to 5,000 mg/100 mL, even more preferably 100 to 5,000 mg/100 mL, 200 to 4,000 mg/mL, even more preferably 250 to 3,000 mg/mL, even more preferably 300 to 3,000 mg/100 mL, even more preferably 500 to 2,000 mg/mL, and most preferably 1,000 mg/100 mL.

The spider mite repellent of the present invention may contain ingredients other than the above as long as the effect of the present invention is not impaired.

The spider mite repellent of the present invention preferably contains the aforementioned active ingredient oil, alcohol, and surfactant. The mass ratio of the active ingredient oil:(the alcohol+ the surfactant) is preferably 100:1 to 100:30, more preferably 100:2 to 100:20, even more preferably 100:1 to 100:10, even more preferably 100:2 to 100:5, and even more preferably 100:3.

In the case where the repellent is used at 50 to 250-fold dilution, the ratio (mass ratio) of the active ingredient oil and the auxiliary ingredients (the alcohol and the surfactant) is preferably 100:1 to 100:30, more preferably 100:1 to 100:10, and most preferably 100:3. In the case of more than 250 to 500-fold dilution, the ratio is preferably 100:1 to 100:30, more preferably 100:1 to 100:20, and most preferably 100:10.

The mass ratio of alcohol:surfactant is preferably 1.0:5.0 to 5.0:1.0, more preferably 1.0:2.5 to 2.5:1.5, even more preferably 1.5:1.0 to 1.0:1.5, and even more preferably 1:1.

<Target Plants>

Target plants to be sprayed with the spider mite repellent of the present invention are plants susceptible to damage by spider mites. The plants are not particularly limited as long as they are susceptible to damage by spider mites. Examples thereof include crop plants (vegetables and fruit trees) and ornamental plants. Typical examples thereof include common beans (green beans), tomatoes, eggplants, watermelons, and strawberries. Among them, watermelons, strawberries, and eggplants are preferred.

<Target Insect Pests>

The spider mite repellent of the present invention has an excellent repellent effect against spider mites. Examples of spider mites as repellent targets of the spider mite repellent of the present invention include spider mites belonging to the Tetranychidae family, for example, spider mites belonging to the Bryobiinae subfamily, the Tetranychinae subfamily, and the like. More specific examples include two-spotted spider mites (*Tetranychus urticae*), Kanzawa spider mites (*Tetranychus kanzawai*), citrus spider mites (*Panonychus citri*), European red mites (*Panonychus ulmi*), thread-footed mites (Tarsonemidae), Phytoseiulus mites (Phytoseiulus *persimilis*), and so on. Among these, two-spotted spider mites are particularly preferred.

<<Repellent Method and Feeding Damage Prevention/Reduction Method>

A second embodiment of the present invention is a method for repelling spider mites from a plant, comprising applying the spider mite repellent of the first embodiment or the active ingredient oil of the first embodiment to the plant.

A third embodiment of the present invention is a method for preventing or reducing feeding damage by spider mites on a plant, comprising applying the spider mite repellent of the first embodiment or the active ingredient oil of the first embodiment to the plant.

Examples of the spider mite repellent, the active ingredient, the plants, and so on include those described in the first embodiment.

It is preferable to apply, to the plant, the spider mite repellent or the active ingredient oil of the first embodiment with a concentration of preferably 10 to 10,000 mg/100 mL, more preferably 20 to 8,000 mg/100 mL, even more preferably 50 to 5,000 mg/100 mL, even more preferably 100 to 5,000 mg/100 mL, even more preferably 200 to 4,000 mg/mL, even more preferably 250 to 3,000 mg/mL, even more preferably 300 to 3,000 mg/100 mL, and even more preferably 500 to 2,000 mg/mL.

Means for applying the spider mite repellent or the active ingredient oil of the first embodiment to the plant include spraying, coating, dipping, and so on. Among these, spraying is particularly preferred because it is simple and is capable of applying the repellent over a wide range.

The spider mite repellent of the present invention may be applied to the entire above-ground part of a plant or to leaves and/or stems of a plant. The spider mite repellent of the present invention may be applied to both or only one of the front and back surfaces of leaves of a plant.

The spider mite repellent of the present invention may be applied to a plant and/or leaves on which spider mites are attached or applied to a plant and/or leaves on which spider mites are not attached. If the repellent is applied to a plant and/or leaves on which spider mites are not attached, it is possible to inhibit spider mites from migrating to a new plant and/or new leaves. Therefore, even if spider mites may be present in a field, an area of spider mites growing in the field can be kept small. Thus, the damage by the spider mites can be minimized.

<<Use in Production of Spider Mite Repellent>>

A fourth embodiment of the present invention is use of the active ingredient oil of the first embodiment in the production of a spider mite repellent.

The spider mite repellent, the active ingredient, and so on are the same as in the first embodiment.

<<Spider Mite Repellent Production Method>>

A fifth embodiment of the present invention is a method of producing a spider mite repellent comprising the step of mixing the active ingredient of the first embodiment with alcohol.

In the above mixing step, the active ingredient of the first embodiment, the alcohol, and a surfactant may be mixed.

The production method of the present invention may further comprise the step of diluting the mixture obtained in the mixing step with water. Examples of the concentration of the active ingredient oil in the case of diluting the mixture with water include the concentration described above.

Examples of the spider mite repellent, the active ingredient, the alcohol, the surfactant, and so on include those described in the first embodiment.

EXAMPLES

Next, test examples related to the present invention will be described, and these examples are not intended to limit the present invention.

The constitutions of representative fatty acids contained in the oils in the tests are as follows.

- Partially hydrogenated high-oleic rapeseed oil (Actor LO-1, manufactured by Riken Vitamin Co., Ltd.)
- Olive oil (extra virgin olive oil): about 80% by mass of oleic acid, about 5% by mass of linoleic acid, about 1% by mass of linolenic acid, about 3% by mass of stearic acid, and about 9% by mass of palmitic acid
- Oleic acid-rich sunflower oil: about 84% by mass of oleic acid, about 7 to 8% by mass of linoleic acid, about 0.1% by mass of linolenic acid, about 3% by mass of stearic acid, and about 4% by mass of palmitic acid
- Oleic acid-rich canola oil: about 76% by mass of oleic acid, about 14% by mass of linoleic acid, about 2% by mass of linolenic acid, about 2% by mass of stearic acid, and about 3 to 4% by mass of palmitic acid
- Oleic acid-rich safflower oil: about 79% by mass of oleic acid, about 12% by mass of linoleic acid, about 0.1% by mass of linolenic acid, about 2% by mass of stearic acid, and about 5% by mass of palmitic acid
- Olive pomace oil: about 74% by mass of oleic acid, about 9 to 10% by mass of linoleic acid, about 1% by mass of linolenic acid, about 3% by mass of stearic acid, and about 11% by mass of palmitic acid <Test 1>

The partially hydrogenated high-oleic rapeseed oil (LO-1) (product name: Actor LO-1, manufactured by Riken Vitamin Co., Ltd.) and an auxiliary agent K were mixed at a mass ratio of 100:3 to prepare a composition to be used in Test 1. The constitution of the auxiliary agent K is as follows.

- Auxiliary agent K: 1-propyl alcohol/CA-42/DO-100=1.5/1.0/0.5 (mass ratio).
- CA-42: Polyoxyethylene castor oil (a degree of polymerization of ethylene is 42, manufactured by TOHO Chemical Industry Co., Ltd.)
- DO-100: Poem DO-100V (diglycerin monooleate, manufactured by Riken Vitamin Co., Ltd.).

A common bean seedling planted in a pot and infected with spider mites was placed in a tank filled with water to prevent the spider mites from migrating to other pots. The composition prepared above was diluted by 50 or 100-fold with water, was sprayed onto a cotyledon as a common bean leaf planted in a pot and not infected with spider mites, and then was air dried. The resultant leaf was clipped to a bean leaf infected with the spider mites. This pot was also placed in a tank to prevent the spider mites from migrating through any portion other than the portion where the leaves were in contact with each other. The cultivation was continued in the above state, and the number of spider mites migrating to the bean leaf not infected with spider mites was checked. As the spider mites, two-spotted spider mites were used (the same applies in the other tests).

The results are presented in Table 1.

TABLE 1

| | Number of Migrated Spider Mites |
|---|---|
| LO-1 (50-fold dilution) | 0 |
| LO-1 (100-fold dilution) | 1 |
| Untreated | more than 50 |

From the results in Test 1, it was found that the compositions containing LO-1 strongly inhibited migration of spider mites as compared with the untreated case.

<Test 2>

The effects of oils other than LO-1 on the migration of spider mites were investigated. The oils used in the test are as specified in Table 2. This test used a chemical solution obtained by mixing each of the oils specified in Table 2 with the auxiliary agent K at the same ratio as in Test 1 and diluting the obtained mixture by 100-fold with water. In the same method as in Test 1, the number of spider mite that migrated to a common bean not infected with spider mites was checked. The evaluation criteria are as follows.

"−": the number of migrated spider mites is 0

"+": the number of migrated spider mites is 1 or more to less than 10

"++": the number of migrated spider mites is 10 or more to less than 50

"+++": the number of migrated spider mites is 50 or more

The results are presented in Table 2.

TABLE 2

| Oil | Number of Migrated Spider Mites |
|---|---|
| LO-1 | − |
| Olive oil | − |
| Oleic acid-rich sunflower oil | ++ |
| Oleic acid-rich canola oil | +++ |
| Oleic acid-rich safflower oil | +++ |
| Linseed oil | +++ |
| Untreated | +++ |

From the results in Test 2, it was found that the migration of spider mites was strongly inhibited even when the olive oil was used besides LO-1. On the other hand, when the oleic acid-rich sunflower oil, the oleic acid-rich canola oil, and the oleic acid-rich safflower oil each having a high content of oleic acid as the constituent fatty acids as with LO-1 and the olive oil were used, the migration of spider mites was not inhibited.

<Test 3>

The effect of LO-1 on the migration of spider mites was further investigated. This test used a chemical solution in which the composition prepared in Test 1 was diluted by 200-fold with water.

Ten common bean seedlings were prepared and divided into five seedlings (five seedlings in a treatment group and five seedlings in a non-treatment group). The five bean seedlings in the treatment group were aligned approximately side by side in a tank filled with water. The right leaf of the two embryonic leaves of the first seedling was connected to the left leaf of the second seedling to allow spider mites to move between the seedlings. The right leaf of the second seedling was connected to the left leaf of the third seedling. By repeating this, the five seedlings were connected together approximately side by side (the total ten leaves in the order from the left leaf of the first seedling to the right leaf of the fifth seedling will be referred to as first to tenth leaves). The five seedlings in the non-treatment group were also connected together in the same manner. The five seedlings in the treatment group and the five seedlings in the non-treatment group were placed in the shape of a "V" letter tilted 90 degrees to the right (the five seedlings in the treatment group formed one of the lines of the V letter and the five seedlings in the non-treatment group forms the other line of the V letter) while the five seedlings in the treatment group and the five seedlings in the non-treatment group were kept out of contact with each other. Lastly, a leaf of a seedling infected with spider mites was placed at an intersection portion of the two lines of the V letter and was connected to each of the left leaves of the first seedlings among the five seedlings in the treatment group and the five seedlings in the non-treatment group. The migration of spider mites to both of the left leaves (first leaves) of the first seedlings was observed.

The chemical solution prepared above was sprayed on the leaves (the third and subsequent leaves) of the second and subsequent seedlings among the five seedling in the treatment group. The five seedlings in the non-treatment group were not treated with the chemical solution. Six days after the spraying, the migration of spider mites was checked. In the non-treatment group, the spider mites reached the tenth leaf. In contrast, in the treatment group, the spider mites reached the third leaf but did not migrate to the fourth and subsequent leaves.

Eight days after the spraying, the chemical solution was again sprayed on the forth and subsequent leaves to which spider mites did not migrate in the seedlings in the treatment group. Six days after the second spraying, the migration of spider mites was checked. In the non-treatment group, the spider mites reached the tenth leaf. In contrast, in the treatment group, the spider mites did not migrate to the fourth leaf.

<Test 4>

In Test 4, a type of alcohol for dissolving the oil was changed to investigate how the repellent effect against spider mites by the active ingredient was influenced.

A chemical solution 1 used was prepared by adding 0.3 g of the auxiliary agent K to 10 g of LO-1, stirring well, and then diluting the obtained mixture with water to 250 mg/100 mL (dilution rate: 400-fold).

A chemical solution 2 used was prepared by adding 0.3 g of an auxiliary agent E, instead of the auxiliary agent K, to 10 g of LO-1, stirring well, and then diluting the obtained mixture with water to 250 mg/100 mL (dilution rate: 400-fold).

Chemical solutions 3 and 4 used were each prepared in the same manner as in the chemical solution 2 except that LO-1 was changed to the olive pomace oil or the olive oil (dilution rate: 400-fold).

The constitutions of the auxiliary agent K and the auxiliary agent E are as follows. The auxiliary agent E has the same constitution as the auxiliary agent K except that ethanol was contained in place of 1-propyl alcohol.

Auxiliary agent K: 1-propyl alcohol/CA-42/DO-100=1.5/1.0/0.5 (mass ratio).

Auxiliary agent E: ethanol/CA-42/DO-100=1.5/1.0/0.5 (mass ratio).

Each of the chemical solutions prepared above was sprayed on one of common bean cotyledons. The cotyledon not sprayed with the chemical solution was connected to a bean leaf infected with spider mites and the cultivation was continued. Three days later, feeding damage marks caused by the spider mites migrated to the cotyledon sprayed with the chemical solution were checked. The evaluation criteria are as follows:

"–": no feeding damage mark: "±": 1 to 5 feeding damage marks: "+": 6 to 15 feeding damage marks: "++": 16 to 30 feeding damage marks: "+++": 31 to 50 feeding damage marks: "++++": 51 to 100 feeding damage mark: and "+++++": more than 100 feeding damage marks.

The results are presented in Table 3.

TABLE 3

| Chemical Solution | Feeding Damage Marks |
|---|---|
| LO-1/Auxiliary agent K | ++ |
| LO-1/Auxiliary agent E | – |
| Olive pomace oil/Auxiliary agent E | – |
| Olive oil/Auxiliary agent E | – |
| Untreated | ++++ |

From the results in Test 4, it was found that the combination of the oil and ethanol produced less feeding damage marks than in the case of the combination of the oil and 1-propyl alcohol, and had the high repellent effect against spider mites even with a low concentration. In addition, it was also found that the olive pomace oil had the repellent effect against spider mites as with the olive oil and LO-1.

<Test 5>

Test 5 examined whether the auxiliary agent K and the auxiliary agent E have the repellent effect against spider mites.

First, 1 g of a composition in which LO-1 and the auxiliary agent K were mixed at a mass ratio of 100:3, and 3 mg of a solution of the auxiliary agent K alone were each prepared and diluted with 100 ml of water (100-fold dilution).

Then, 100 mg of a composition in which the olive pomace oil and the auxiliary agent E were mixed at a mass ratio of 100:3, and 3 mg of a solution of the auxiliary agent E alone were each prepared and diluted with 100 mL of water.

Each of the chemical solutions thus obtained was sprayed on one of common bean cotyledons. After air drying, the cotyledon not sprayed with the chemical solution was connected to a leaf infected with spider mites and the cultivation was continued. Then, the numbers of feeding damage marks by spider mites migrating to the sprayed cotyledons were compared. The evaluation criteria are as follows:

"–": no feeding damage mark: "±": 1 to 5 feeding damage marks: "+": 6 to 15 feeding damage marks: "++": 16 to 30 feeding damage marks: "+++": 31 to 50 feeding damage marks: "++++": 51 to 100 feeding damage mark; and "+++++": more than 100 feeding damage marks.

The results are presented in Table 4.

TABLE 4

| Chemical Solution | Feeding Damage Marks |
|---|---|
| LO-1/Auxiliary agent K | – |
| Auxiliary agent K | +++++ |
| Olive pomace oil/Auxiliary agent E | – |
| Auxiliary agent E | +++++ |
| Untreated | +++++ |

From the results in Test 5, the auxiliary agent K or the auxiliary agent E alone did not inhibit the feeding damage at all and did not have the repellent effect against spider mites. From these results, the repellent effect against spider mites of the present invention is considered to be produced not by the auxiliary agent but by the aforementioned particular oil.

The present specification includes the contents described in the specification and/or the scope of claims of Japanese Application No. 2021-009480, which is the basis of priority of this application. In addition, all publications, patents and patent applications cited herein are hereby incorporated by reference in their entirety.

INDUSTRIAL APPLICABILITY

According to the present invention, it is possible to provide a novel spider mite repellent capable of inhibiting feeding damage by spider mites. Therefore, the spider mite repellent of the present invention is industrially very advantageous.

What is claimed is:

1. A spider mite repellent emulsion consisting essentially of effective amounts of:
a) diglycerin monooleate;
b) olive pomace oil or partially hydrogenated high-oleic rapeseed oil;
c) 1-propyl alcohol or ethanol; and
d) water.

2. The spider mite repellent emulsion of claim 1, consisting essentially of effective amounts of:
a) diglycerin monooleate;
b) olive pomace oil or partially hydrogenated high-oleic rapeseed oil;
c) 1-propyl alcohol; and
d) water.

3. The spider mite repellent emulsion of claim 1, consisting essentially of effective amounts of:
a) diglycerin monooleate;
b) olive pomace oil or partially hydrogenated high-oleic rapeseed oil;
c) ethanol; and
d) water.

4. A method for repelling spider mites from a plant, consisting essentially of applying the spider mite repellent emulsion of claim 1 to the plant.

5. A method for reducing feeding damage by spider mites on a plant, consisting essentially of applying the spider mite repellent emulsion of claim 1 to the plant.

6. The spider mite repellent emulsion of claim 1, consisting essentially of effective amounts of:
a) diglycerin monooleate;
b) olive pomace oil;
c) 1-propyl alcohol or ethanol; and
d) water.

7. The method of claim 4, wherein the spider mite repellent emulsion is applied to the plant and/or leaves of the plant on which spider mites are not attached.

8. The method of claim 5, wherein the spider mite repellent emulsion is applied to the plant and/or leaves of the plant on which spider mites are not attached.

9. The spider mite repellent emulsion of claim 1, consisting essentially of effective amounts of:
a) diglycerin monooleate;
b) olive pomace oil;
c) ethanol; and
d) water.

10. The spider mite repellent emulsion of claim 1, consisting essentially of effective amounts of:
a) diglycerin monooleate;
b) olive pomace oil;
c) 1-propyl alcohol; and
d) water.

* * * * *